United States Patent [19]

Yaotani et al.

[11] Patent Number: 4,461,509
[45] Date of Patent: Jul. 24, 1984

[54] ROOF STRUCTURE

[75] Inventors: Kouichi Yaotani, Akigawa; Masao Tashoh, Kamakura, both of Japan

[73] Assignee: Nissan Motor Company, Limited, Yokohama, Japan

[21] Appl. No.: 317,328

[22] Filed: Nov. 2, 1981

[30] Foreign Application Priority Data

Nov. 4, 1980 [JP]   Japan ........................... 56-157768[U]

[51] Int. Cl.³ ............................................. B62D 25/06
[52] U.S. Cl. ................... 296/214; 403/292; 403/313; 403/344; 211/182
[58] Field of Search ............... 296/210, 214; 135/104, 135/106, 119; 403/302, 309, 310, 313, 344, 3, 292, 295, 298, 3; 211/182, 105.1, 123, 16, 113; 248/558; 16/125

[56] References Cited

U.S. PATENT DOCUMENTS

| | | | |
|---|---|---|---|
| 425,787 | 4/1890 | Hartshorn | 403/313 |
| 1,377,101 | 5/1921 | Sparling | 403/313 |
| 2,522,174 | 9/1950 | Hermsmeyer | 211/213 |
| 3,393,006 | 7/1968 | Resch et al. | 296/214 |
| 3,422,565 | 8/1969 | Kentfield et al. | 403/292 |
| 3,424,178 | 1/1969 | Yazaki | 135/106 |
| 3,953,067 | 4/1976 | Isola | 296/214 |
| 4,018,370 | 4/1977 | Wood | 403/298 |
| 4,023,913 | 5/1977 | Berkowitz | 403/2 |
| 4,227,542 | 10/1980 | Bonfilio | 135/106 |

FOREIGN PATENT DOCUMENTS

| | | | |
|---|---|---|---|
| 521542 | 2/1956 | Canada | 296/214 |
| 1274902 | 8/1968 | Fed. Rep. of Germany . | |
| 2022127 | 7/1970 | France . | |
| 2354220 | 1/1978 | France . | |
| 1214948 | 12/1970 | United Kingdom | 296/214 |

*Primary Examiner*—Robert B. Reeves
*Assistant Examiner*—Dennis H. Pedder
*Attorney, Agent, or Firm*—Schwartz, Jeffery, Schwaab, Mack, Blumenthal & Koch

[57] ABSTRACT

A roof structure for an automotive vehicle includes a roof panel, a roof rail, a head lining and a support member therefor. The support member is divided into three parts: a main part and two side parts. The main part is separate from at least one side part. The main part may be separate from one side part and formed integrally with the other side part. The main part may be separate from both side parts. Each side part is fixed to the roof rail. The side part or parts are joined to the main part by means of a joint member. The joint member may be formed in various manners. The joint member includes an insertion portion and a rib formed thereon.

7 Claims, 21 Drawing Figures

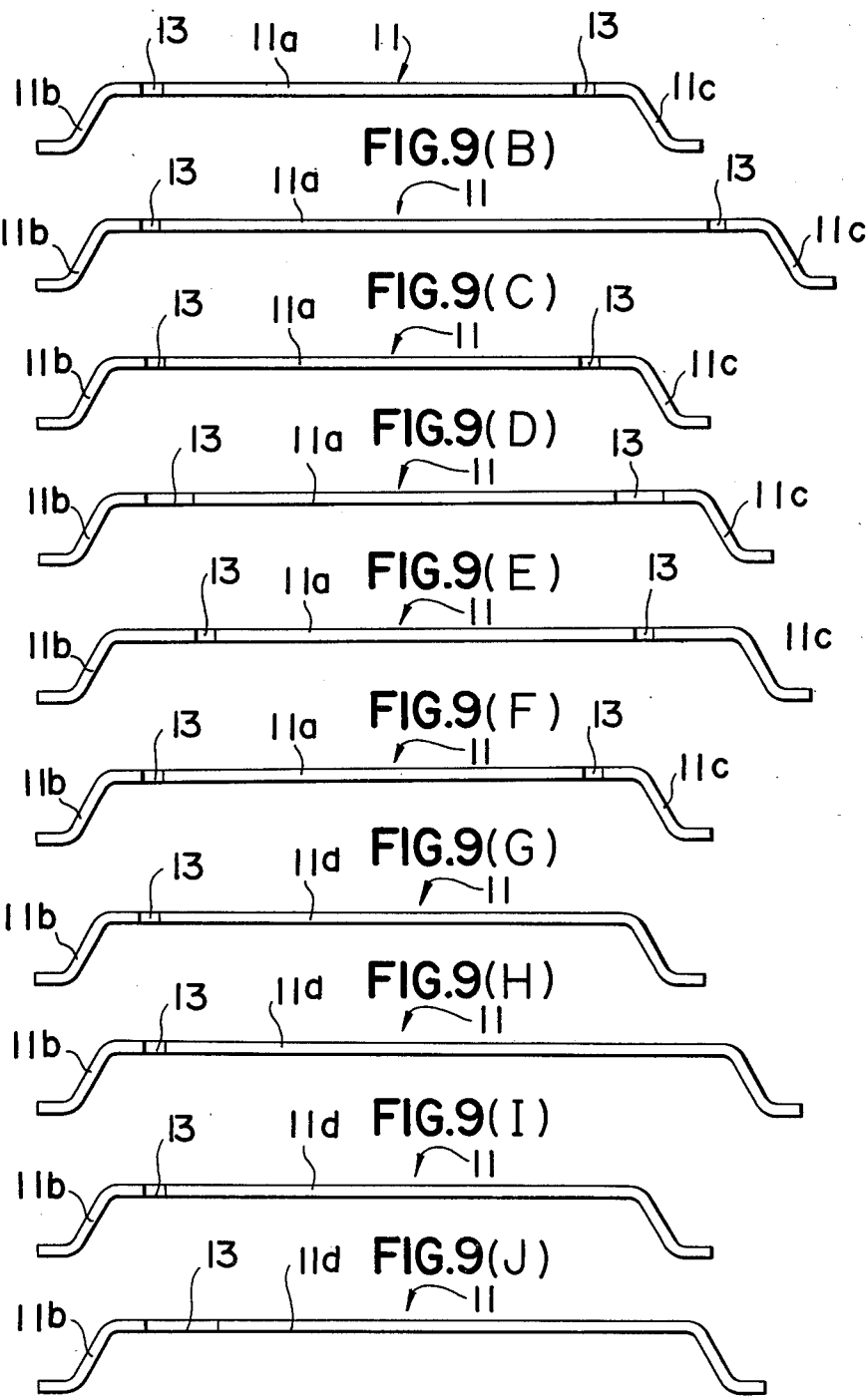

ROOF STRUCTURE

BACKGROUND OF THE INVENTION

This invention relates to an improved roof structure for an automotive vehicle.

FIG. 1 shows a conventional roof structure of an automotive vehicle. A support member 1 is made of a rod having a circular cross-section. A plurality of support members 1 support a head lining 4 which is suspended therefrom inside a roof panel 3. Both ends of the support member 1 are directly fixed to a roof rail or rails 2.

In such a structure, the length of each support member 1 must be precisely predetermined. Various sizes of support members 1 are produced at a manufacturing plant and assembled at another place.

The support members 1 vary in length or size depending on automotive types. Even in the case of the same type of automotive vehicle, the support members 1 have different sizes so as to be fixed at different positions with respect to the roof rail 2.

Thus, in a conventional roof structure, a standard support member 1 cannot be used for different types of automotive vehicles or at different positions with respect to the roof rail. In other words, a large number of various support members 1 must be manufactured at the manufacturing plant prior to assembly in view of the various types of automotive vehicles and resulting different lengths of the support members required.

SUMMARY OF THE INVENTION

According to the present invention, a roof structure for an automotive vehicle includes a roof panel, a roof rail, a head lining and a support member therefor. The support member includes a main part and two side parts. The main part is separate from at least one side part. The main part may be separate from one side part and formed integrally with the other side part. The main part may be separate from both side parts. Each side part is fixed to the roof rail. The side part or parts are joined to the main part by means of a joint member. The joint member may be formed in various manners. The joint member includes an insertion portion and a rib formed thereon.

The support member is made of a hollow tube, having a slit in its longitudinal direction.

The object of the present invention is to provide a roof structure for an automotive vehicle in which the whole length of a support member for a head lining can be easily adjusted.

BRIEF DESCRIPTION OF THE DRAWINGS

FIGS. 9A through 9J show a variety of conditions in which main members are joined to side members according to the present invention.

DETAILED DESCRIPTION OF THE PREFERRED EMBODIMENTS

Figure 1:
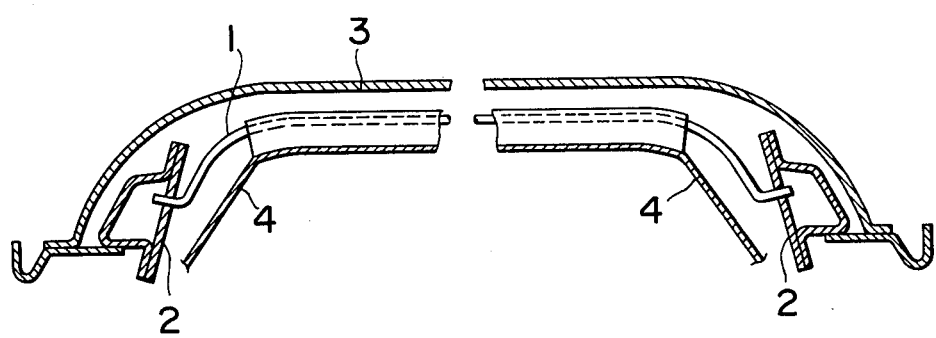
FIG. 1 is a front view showing a conventional roof structure for an automotive vehicle.
Figure 2:
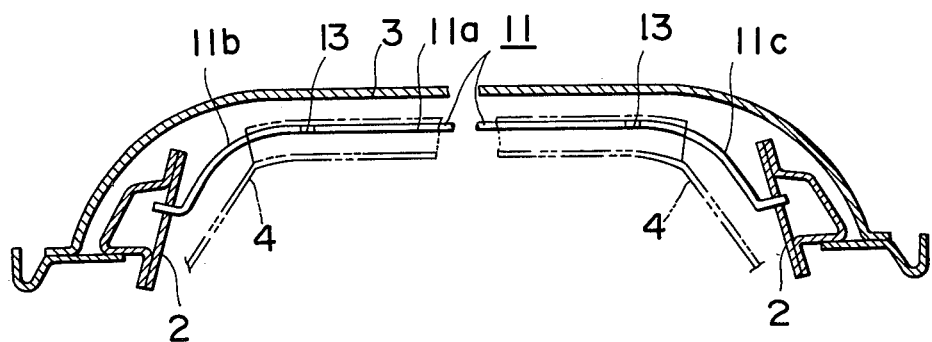
FIG. 2 is a schematic front view showing a roof structure for an automotive vehicle according to a preferred embodiment of the present invention.
Figure 3:
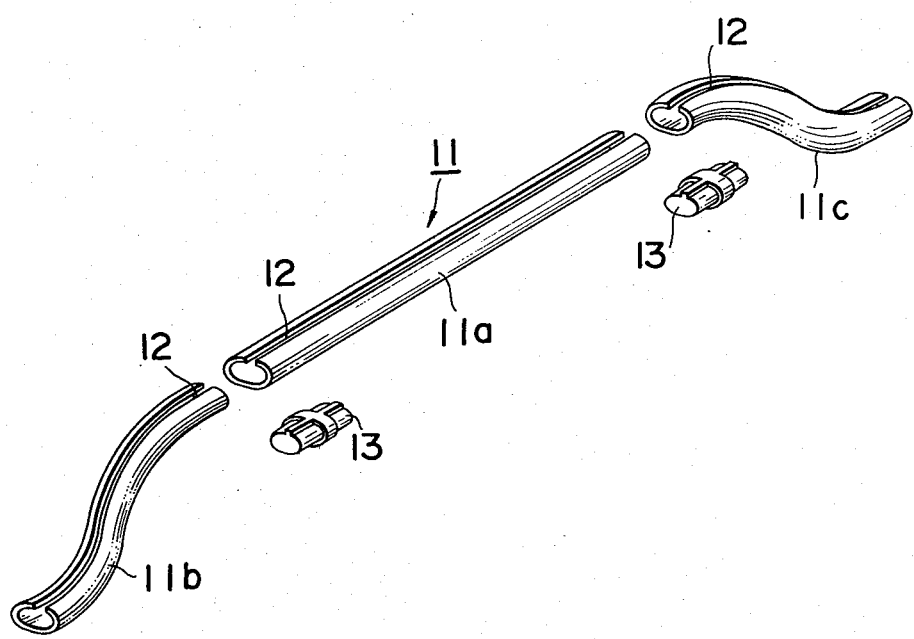
FIG. 3 is a perspective view showing a support member divided into three parts according to the present invention.

Referring to FIG. 3, a support member 11 is made of a hollow tube, having a slit 12 in its longitudinal direction through its whole length. The support member 11 is divided into three parts 11a, 11b and 11c. The main part 11a is straight. The two side parts 11b, 11c are slightly curved along a roof panel 3 (FIG. 2).

The side parts 11b, 11c are joined to the opposite ends of the main part 11a by means of a joint member 13 so as to form an assembled support member 11 as a single unit. The joint member 13 is made of a synthetic resin.

As shown in FIG. 2, the two side parts 11b, 11c are fixed to the roof rail 2 in a conventional manner. The head lining 4 is supported by the support member 11 in a suspension-like manner form.

Except for the support member 11, the roof structure can be substantially the same as the prior art so that those conventional parts are not described in detail.

Figure 4A:
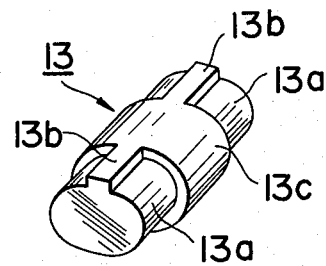
FIG. 4A is a perspective view showing a joint member according to the present invention.

Referring to FIG. 4A, the joint member 13 includes a central separation portion 13c and a pair of insertion portions 13a formed at both ends thereof. A rib 13b is formed on each insertion portion 13a in the longitudinal direction of the joint member 13. The rib 13b and the separation portion 13c are formed in such a manner that they can fit on the joint end of the main part 11a and the side parts 11b, 11c. In other words, the vertical section of the rib 13b and the insertion portion 13a is substantially the same as that of the main and side parts 11a, 11b, 11c.

Figure 4B:
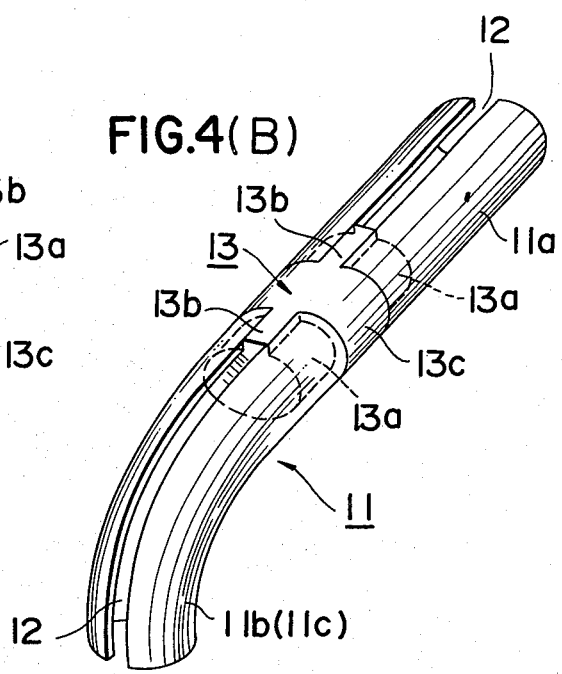
FIG. 4B shows a condition in which the joint member shown in FIG. 4A is used.

When the main part 11a is joined to the side part 11b, 11c, the ribs 13b are positioned in and engage with the slit 12. The ends of the separation portion 13c engage the joint end of the main part 11a and the joint end of the side part 11b, 11c. It is preferable that the separation portion 13c, the ribs 13b, the side part 11b or 11c and the main part 11a form a continuous flat surface as shown in FIG. 4B when they are tightly joined together.

Figure 5A:
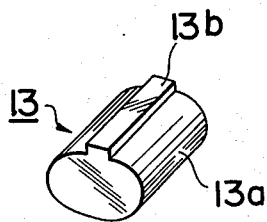
FIG. 5A is a perspective view showing another joint member according to the present invention.

FIG. 5A shows a further joint member 13 in which a central separation portion is omitted. A rib 13b is formed on an insertion portion 13a in its longitudinal direction.

Figure 5B:
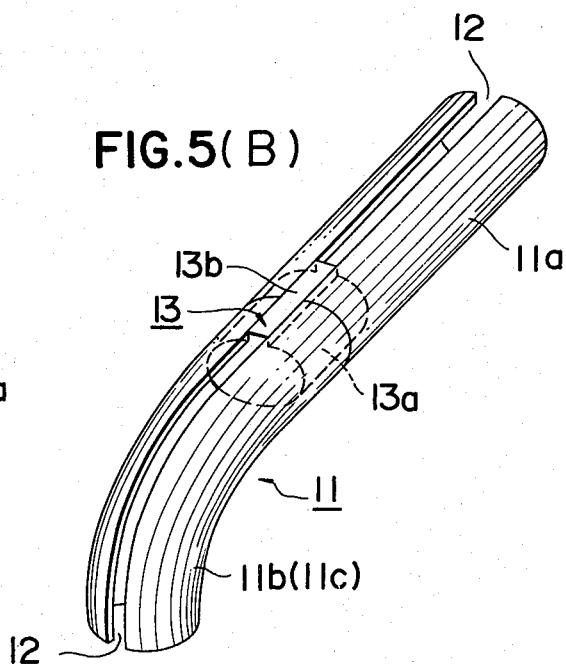
FIG. 5B shows a condition in which the joint member shown in FIG. 5A is used.

FIG. 5B shows a condition in which the main part 11a is joined to the side part 11b or 11c by means of the joint member 13 shown in FIG. 5A. The joint end of the main part 11a engages the joint end of the side part 11b or 11c directly. The rib 13b is placed in and engages the slit 12.

According to the above-stated embodiments of the present invention, a support member 11 is assembled by using a joint member 13 so that the whole length of the support member 11 can be easily changed only by selecting various sizes of main parts 11a. In such a case, a common side part can be applied to a variety of support members 11 having different lengths. The main part 11a, which is straight, can be very easily manufactured with different lengths.

In case of the embodiment shown in FIGS. 4A and 4B, the whole length of the support member 11 can be adjusted merely by changing the width of the central separation portion 13c of the joint member 13 even if the main and side parts have the same sizes.

Also, if a common main part 11a is used, then various sizes of side parts 11b, 11c can be used to adjust the whole length of the support member 11. See FIGS. 9E and 9F, for instance.

Whenever the main part 11a is joined to the side parts 11b, 11c, the rib or ribs 13b are placed in and engage the slit so that the main and side parts can be properly assembled without errors. Also, they can be prevented from rotating with respect to each other.

Figure 6A:
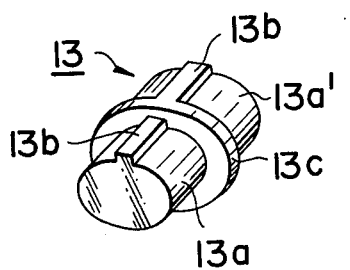
FIG. 6A is a perspective view showing still another joint member according to the present invention.

FIG. 6A shows another embodiment of a joint member 13. Two insertion portions 13a and 13a' formed at both ends of the central separation portion 13c are different in size.

Figure 6B:
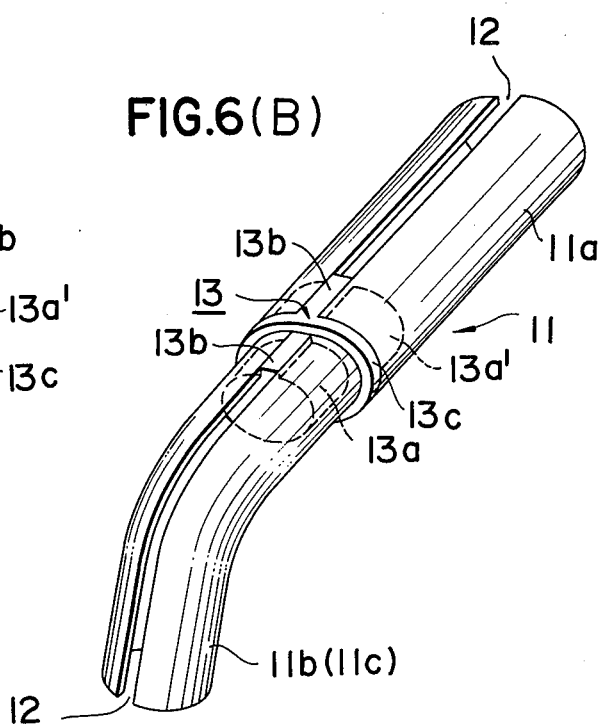
FIG. 6B shows a condition in which the joint member shown in FIG. 6A is used.

FIG. 6B shows a condition in which the joint member 13 shown in FIG. 6A is used to join the main and side parts 11a, 11b. The size of the main part 11a is larger in diameter than that of the side parts 11b, 11c. The side part 11b or 11c is joined to the small insertion portion 13a of the joint member 13 while the main part 11a is joined to the large insertion portion 13a' thereof.

In the embodiment of FIGS. 6A and 6B, not only the whole length of the support member 1 but also the strength thereof can be easily adjusted by selecting a combination of those parts.

Figure 7:
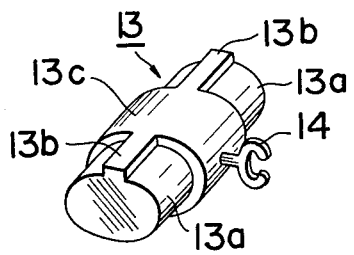
FIG. 7 is a perspective view showing another joint member according to the present invention.

FIG. 7 shows another joint member 13 having a support arm 14. Except for the support arm 14, the embodiment of FIG. 7 is substantially the same as that of FIG. 4A. Therefore, the construction of the joint member 13 in FIG. 7 is not described in detail.

The support arm 14 formed on the central separation portion 13c is used to support a lead wire or the like within a roof. In the prior roof structure, such the support arm is attached to the roof rail or other special member by means of welding, for instance, so that attachment thereof is relatively difficult. Further, the position or placement of such a lead wire is not desirable from the point of view of safety. According to the embodiment of FIG. 7, such defects of the prior art can be solved.

Although in the above-stated embodiments the support member 11 is divided into three parts, according to the present invention, the support member 11 can be divided into two parts.

Figure 8:
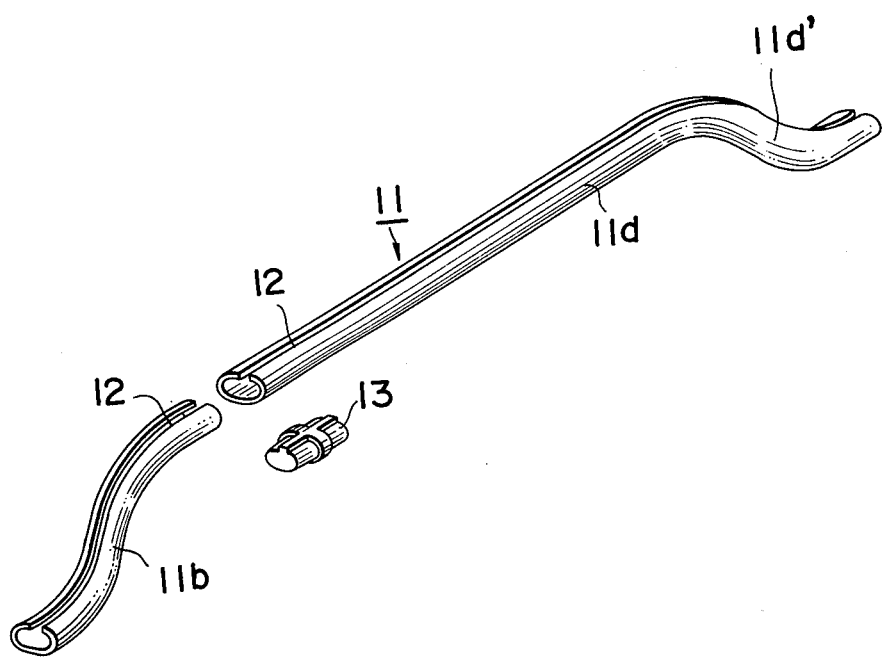
FIG. 8 is a perspective view showing a support member divided into two parts according to the present invention.

FIG. 8 shows an example of a support member 13 divided into two parts. The main part 11d has a side part 11d' formed integrally with the main part 11d. In other words, the main part 11d and the side part 11d' are formed as one body. The other side part 11b is separate from the main part 11d, and they are joined by means of the joint member 13 shown in FIG. 4A, for example. Needless to say, other types of joint members can be used.

In to the embodiment of FIG. 8, the whole length and strength of the support member 11 can be adjusted easily as can be seen from FIGS. 9G through 9J. FIGS. 9G and 9H show that the whole length of the support member 11 can be adjusted by selecting a preferred main part 11d only. FIGS. 9I and 9J show that the whole length of the support member 11d can be adjusted by changing the length of the joint member 13 or the width of the central separation portion thereof.

As can be seen from FIGS. 9A to 9J, according to the present invention, only one among a main part, a side part and a joint member can be changed in order to adjust the whole length of a support member for the roof structure. Therefore, a large number of lengths of support members can be easily obtained even if several standardized parts thereof and joint members are used. As the support member is made of a hollow tube, it is light as compared with the prior art.

The present invention is not limited only to the embodiment shown and disclosed. For example, a joint member can be formed in any other configuration and construction if the main part can be tightly joined to the side part.

What is claimed is:

1. A vehicle roof lining support structure comprising:
   (a) at least one tubular support member adapted to be fixed at both ends thereof to roof rails extending along a longitudinal direction of said vehicle, said tubular support member comprising:
      (i) a main tubular part,
      (ii) two tubular side parts disposed at opposite ends of said main tubular part, at least one of said tubular side parts being separate from said main part,
      (iii) each tubular side part having a curved section, one end of which is adapted to be fixed to said roof rails, and
      (iv) said main tubular part and each of said tubular side parts having a slit provided therein and extending along the entire longitudinal direction thereof, said slit oriented along the longitudinal axis of said main and side parts and extending from the exterior to the interior of said main and side parts; and
   (b) a joint member connected between said main tubular part and said at least one tubular side part, said joint member including:
      (i) a first insertion portion insertable into said tubular main part, said first insertion portion having a rib insertable into said slit of said main tubular part and
      (ii) a second insertion portion insertable into said at least one tubular side part, said second insertion portion having rib insertable into said slit of said at least one tubular side part,
   whereby said main and side tubular parts and said joint member form a unitary construction for said roof lining support structure.

2. A vehicle roof lining support structure as recited in claim 1 wherein said joint member further includes a central separation portion disposed along the outer circumferential surface thereof and defining first and second abutment surfaces for contact with an end of said main tubular part and an end of said at least one tubular side part respectively.

3. A vehicle roof lining support structure as recited in claim 2 wherein said central separation portion of said joint member further includes a support arm for supporting a lead wire.

4. A vehicle roof lining support structure as recited in claim 1 wherein said first and second insertion portions have the same diameter.

5. A vehicle roof lining support structure as recited in claim 1 wherein said first and second insertion portions have different diameters.

6. A vehicle roof lining support structure as recited in claim 1 wherein said joint member further comprises a support arm for supporting a lead wire.

7. A vehicle roof lining support structure as recited in claim 1 wherein said joint member is made of a synthetic resin.

* * * * *

UNITED STATES PATENT AND TRADEMARK OFFICE
CERTIFICATE OF CORRECTION

PATENT NO. : 4,461,509
DATED : July 24, 1984
INVENTOR(S) : Kouichi YAOTANI et al It is certified that error appears in the above-identified patent and that said Letters Patent is hereby corrected as shown below:

On the face of the patent, item 73 "Assignee" should read:

-- NISSAN MOTOR COMPANY, LIMITED, and KATO HATSUJO KAISHA LIMITED, both of Yokohama, Japan --

Signed and Sealed this

Fourth Day of June 1985

[SEAL]

Attest:

DONALD J. QUIGG

Attesting Officer   Acting Commissioner of Patents and Trademarks